United States Patent [19]

Tamai et al.

[11] Patent Number: 5,065,304
[45] Date of Patent: Nov. 12, 1991

[54] CONTROLLER FOR AC POWER CONVERTER

[75] Inventors: Shinzo Tamai; Hidehiko Sugimoto, both of Hyogo, Japan

[73] Assignee: Mitsubishi Denki Kabushiki Kaisha, Tokyo, Japan

[21] Appl. No.: 557,237

[22] Filed: Jul. 25, 1990

[30] Foreign Application Priority Data

Jul. 28, 1989 [JP] Japan .................................. 1-197521

[51] Int. Cl.⁵ ............................................ H02M 7/68
[52] U.S. Cl. ....................................... 363/95; 363/97; 363/98
[58] Field of Search ...................... 363/95, 97, 98, 131, 363/132

[56] References Cited

U.S. PATENT DOCUMENTS 4,367,522  1/1983  Forstbauer et al. ............... 363/96 X
4,823,251  4/1989  Kawabata et al. .................... 363/95

Primary Examiner—Steven L. Stephan
Assistant Examiner—Emanuel Todd Voeltz
Attorney, Agent, or Firm—Rothwell, Figg, Ernst & Kurz

[57] ABSTRACT

A controller for AC power converter having an LC filter connected to a load, can suppress fluctuation of the output bus voltage against disturbance, particularly against fluctuation of load current by calculating a capacitor current command from a voltage feed back value and then adding an interference component caused by a reactor and a capacitor to the voltage command of the AC power converter.

7 Claims, 4 Drawing Sheets

CONTROLLER FOR AC POWER CONVERTER

BACKGROUND OF THE INVENTION

1. Field of the Invention

The present invention relates to a controller for an AC power converter comprising a filter connected to a load through an output bus.

2. Description of the Prior Art

As an example of a controller for an AC power converter of the prior art, Transaction of Semiconductor Power Conversion Group SPC-86-59, Japan Electrical Engineering Society reports "Waveform Control System of Constant Frequency Sine Wave Inverter". FIG. 1 is a block diagram of the structure of this control system.

In FIG. 1, the reference numeral 100 denotes an inverter body; 102, a reactor; 103, a capacitor forming an LC filter with the reactor 102; 121, a current controller; 122, a subtractor; 123, a limiter for limiting current commands; 124, an adder; 126, a voltage controller; 127, a reference capacitor current generator; 128, a subtractor; 129, an output voltage reference generator; 131, a load current detector; 134, a PWM modulation circuit; 151, a clock circuit.

Next, operations will be explained. The inverter body 100 is controlled by the PWM circuit 134 according to an output of the current controller 121 as voltage command and supplies AC power to a load through an LC filter of reactor 102 and capacitor 103. This figure indicates a single phase inverter; however the principle is the same for a 3-phase inverter.

An output current $i_f$ of inverter body 100 is controlled at a high speed by taking the deviation of $i_f$ from a detected current signal in the subtractor 122 using an output current i* of the current command limiter 123 and generating a voltage command through the current controller 121 in accordance with the deviation. Therefore, an over current condition by a sudden change of load impedance can be suppressed to protect power conversion elements of the inverter body 100. This output current command is expressed by a sum of load current and capacitor current of the LC filter to be supplied for establishing output bus voltage. Accordingly, a reference capacitor current is calculated by the signal of clock circuit 151 synchronized with the output bus voltage through the reference capacitor current generator 127 and the output current $i_0^*$ of this reference capacitor current generator 127 is added to the detected load current signal detected by the load current detector 131 in the adder 124 to generate a current command. In this case, deviation between the detected output voltage signal applied to the load and a reference voltage generated by the output voltage reference generator 129 is obtained by the subtractor 128 and this deviation is inputted to the voltage controller 126 for the purpose of voltage control. The voltage control characteristic can be improved by using a current command which is obtained by adding, as explained above, both the load current detecting signal from the load current detector 131 and the output current $i_0^*$ of the reference capacitor current generator 127 to the output of the voltage controller 126.

The control system of FIG. 1 can be expressed by the formulae as indicated below.

$$Viu = GI(s)(Iiu^* - Iiu) \quad (1)$$

$$Iiu^* = Iou + \omega cE\cos(\omega t) + Gv(s)[E\sin(\omega t) - Vou] \quad (2)$$

Where, Viu is an output voltage of phase U of the inverter body 100, Vou is an output bus voltage of phase U, Iiu is an output current of phase U of the inverter body 100, Iiu* is an output current command of phase U of the inverter body 100, Iou is a load current of phase U, ω is an angular frequency of output bus voltage, E is an effective value command of output bus voltage, c is an electrostatic capacitance of capacitor, and GI(s), Gv(s) are control elements of current controller 121 and voltage controller 126 respectively.

The control system of FIG. 1 directly controls the AC detection signal. Since this system performs the so-called follow-up control, the integral element cannot be introduced into the control elements GI(s), Gv(s) and thereby a voltage waveform may be distorted depending on a load, resulting in malfunction of a load apparatus in some cases.

Moreover, as indicated below in addition to the prior art example shown in FIG. 1, control can be realized by converting an AC signal into A DC signal through a coordinate converter.

FIG. 2 shows, for example, a conventional controller for an AC power converter as disclosed in the specification of prior art application No. 63-133073 by the same applicant of the present invention. A No. 1 inverter 1 supplies a power signal to a load 4 in parallel with a No. 2 inverter 2 of the same structure through a bus 3.

The elements of this No. 1 inverter similar to those of FIG. 1 are given like reference numerals and their explanation is not repeated here. In FIG. 2, 104 is an output switch; 120, an adder; 125, a limiter; 132, a voltage detector; 133, a current detector; 135, a shared current detector; 140, 2-phase/3-phase converter; 141, 142, 143, 3-phase/2-phase converter; 149, a PLL (phase locked loop) circuit; 150, 3-phase sine wave generator; 160, 161, CT (current transformer).

Operations of the controller for the AC power converter shown in FIG. 2 will now be explained. The No. 1 inverter 1 is mainly composed of an inverter body 100, a reactor 102 and a capacitor 103 to convert DC power of from DC power supply 5 into AC power and to output the AC power to the output bus 3 and supply the a power to the load 4.

The inverter current is detected by CT 160 and current detector 133, while the load current is detected by CT 161a and the output bus voltage is detected by a voltage detector 132. These voltages and currents are detected as AC values but when these are mapped onto the orthogonal coordinate system which rotates in synchronism with the basic wave, the basic wave can be treated as a DC value and thereby control can be made easy. Therefore, the reference sine wave for coordinate conversion is generated from the output bus voltage by using PLL 149 and sine wave generator 150 and those currents and voltages are converted to DC values by controlling the 3-phase/2-phase converters 141, 142, 143 with such reference sine wave.

The reference output voltage generator 129 outputs a line effective value command of the output bus voltage. Deviation between this line effective value command and the output bus voltage of 3-phase/2-phase converter 142 is calculated using the subtractor 128 and a current command for correcting voltage deviation is generated by the voltage controller 126. Moreover, since a load current must be applied to a capacitor to cause it to generate a constant AC voltage, the reference current is generated by the reference capacitor current generator 127.

In the example of FIG. 2, since the inverters are connected in parallel to the output bus 3, the shared current detector 135 determines a load current command so that each inverter shares the load current. This load current command is restricted by the limiter 125 to prevent the load current command from exceeding the capacity of the inverter. The load current command from the limiter 125 the output of reference capacitor current generator 127, and the output of voltage controller 126 are added up in the adder 124 to obtain an inverter current command value through the limiter 123.

The inverter current control system takes the deviation between an inverter current from the 3-phase/2-phase converter 141 and a command value of inverter current from the limiter 123 in the subtractor 122 and adds an output of the current controller 121 to the output bus voltage from the 3-phase/2-phase converter 142 in the adder 120 to obtain the inverter voltage command. This inverter voltage command is converted back to a 3-phase AC voltage command in the 2-phase/3-phase converter 140 and corresponding voltage is outputted from the inverter body 100 through PWM control of the PWM circuit 134.

The control system of FIG. 1 can be further expressed by the formulae (3) and (4) below.

The formulae (3), (4) can be applied to the inverter including an LC filter. Voltages and currents indicate the values on the rotatable coordinate axes; $V\gamma i$, $V\delta i$ are inverter voltages; $V\gamma o$, $V\delta o$ are output bus voltages; $I\gamma i$, $I\delta i$ are inverter currents; $I\gamma o$, $I\delta o$ are load currents. C, G are capacitance of capacitor and conductance respectively; L, R are reactance of reactor and resistance respectively.

$$s \begin{bmatrix} V\gamma o \\ V\delta o \end{bmatrix} = \begin{bmatrix} -G/C & \omega \\ -\omega & -G/C \end{bmatrix} \begin{bmatrix} V\gamma o \\ V\delta o \end{bmatrix} + 1/C \begin{bmatrix} I\gamma i - I\gamma o \\ I\delta i - I\delta o \end{bmatrix} \quad (3)$$

$$s \begin{bmatrix} I\gamma i \\ I\delta i \end{bmatrix} = \begin{bmatrix} -R/L & \omega \\ -\omega & -R/L \end{bmatrix} \begin{bmatrix} I\gamma i \\ I\delta i \end{bmatrix} + 1/L \begin{bmatrix} V\gamma i - V\gamma o \\ V\delta i - V\delta o \end{bmatrix} \quad (4)$$

Meanwhile, the control system of FIG. 2 can be expressed by the formulae (5) and (6).

$$\begin{bmatrix} I\gamma i \\ I\delta i \end{bmatrix} = \begin{bmatrix} V\gamma o \\ V\delta o \end{bmatrix} + GI(s) \begin{bmatrix} I\gamma i^* - I\gamma o \\ I\delta i^* - I\delta o \end{bmatrix} \quad (5)$$

$$\begin{bmatrix} I\gamma i^* \\ I\delta i^* \end{bmatrix} = \begin{bmatrix} I\gamma o \\ I\delta o \end{bmatrix} + \begin{bmatrix} 0 & -\omega C \\ \omega C & 0 \end{bmatrix} \begin{bmatrix} V\gamma o \\ V\delta o \end{bmatrix} + Gv(s) \begin{bmatrix} V\gamma o^* - V\gamma o \\ V\delta o^* - V\delta o \end{bmatrix} \quad (6)$$

Where, $V\gamma o^*$, $V\delta o^*$ are $\gamma$ axis and $\delta$ axis output bus voltage commands respectively.

It is understood that $V\gamma o$, $V\delta o$ are added to the output of current controller in the formula (5) because $V\gamma o$, $V\delta o$ become a disturbance on the current control as seen in the formula (4) and therefore the influence thereof must be compensated. Moreover, the terms $I\gamma o$, $I\delta o$, $\omega CV\gamma o$ and $\omega CV\delta o$ in the formula (6) compensate for influence of both the disturbance caused by $I\gamma o$, $I\delta o$ and the interference caused by $\omega CV\gamma o$, $\omega CV\delta o$ in voltage control as seen in the formula (3). As explained above, improved control performance of current, voltage control system enables an inverter to prevent the over current condition due to change of load and fault of inverter.

A non-linear load such as a capacitor input type rectifier is often used as the load 4 and a current including harmonics often flows into the output bus.

As will be understood from the formula (3), fluctuation of load currents $I\gamma o$, $I\delta o$ appear in directly as fluctuation of output bus voltage.

The formulae (3) and (4) may be transformed as follows.

$$s \begin{bmatrix} V\gamma o \\ V\delta o \end{bmatrix} = 1/C \begin{bmatrix} D\gamma \\ D\delta \end{bmatrix} \quad (7)$$

$$s \begin{bmatrix} D\gamma \\ D\delta \end{bmatrix} = \begin{bmatrix} -G/C & \omega \\ -\omega & -G/C \end{bmatrix} \begin{bmatrix} D\gamma \\ D\delta \end{bmatrix} + 1/L \begin{bmatrix} V\gamma i - V\gamma o \\ V\delta i - V\delta o \end{bmatrix} + \begin{bmatrix} -R/L & \omega \\ -\omega & -R/L \end{bmatrix} \begin{bmatrix} I\gamma i \\ I\delta i \end{bmatrix} - s \begin{bmatrix} I\gamma o \\ I\delta o \end{bmatrix} \quad (8)$$

Where $$\begin{bmatrix} D\gamma \\ D\delta \end{bmatrix} = \begin{bmatrix} I\gamma i - I\gamma o \\ I\delta i - I\delta o \end{bmatrix} - \begin{bmatrix} G & -\omega C \\ \omega C & G \end{bmatrix} \begin{bmatrix} V\gamma o \\ V\delta o \end{bmatrix} \quad (9)$$

Moreover, the formulae (5), (6) may be transformed as follows.

$$\begin{bmatrix} V\gamma i \\ V\delta i \end{bmatrix} = \begin{bmatrix} V\gamma o \\ V\delta o \end{bmatrix} + GI(s) \left( \begin{bmatrix} D\gamma^* \\ D\delta^* \end{bmatrix} - \begin{bmatrix} D\gamma \\ D\delta \end{bmatrix} \right) + \begin{bmatrix} 0 & -\omega C \\ \omega C & 0 \end{bmatrix} \begin{bmatrix} V\gamma^* \\ V\delta^* \end{bmatrix} - \begin{bmatrix} G & -\omega C \\ \omega C & G \end{bmatrix} \begin{bmatrix} V\gamma o \\ V\delta o \end{bmatrix} \quad (10)$$

$$\begin{bmatrix} D\gamma^* \\ D\delta^* \end{bmatrix} = Gv(s) \begin{bmatrix} V\gamma o^* - V\gamma o \\ V\delta o^* - V\delta o \end{bmatrix} \quad (11)$$

Comparison of formulae (7), (8) with (10), (11) suggests that the control system of FIG. 2 compensates for output bus voltage components and capacitor current component in order to suppress fluctuation of the output bus voltage, but the output bus voltage happens to be distorted and results in influence such as malfunction of the load as in the case of the first example shown in FIG. 1 due to the following reasons.

1) Control of charging currents $D\gamma$, $D\delta$ based on formula (8) causes fluctuation of output bus voltage because output currents $I\gamma i$, $I\delta i$ and charging currents $D\gamma$, $D\delta$ are included as the interference terms and the charging currents $D\gamma$, $D\delta$ fluctuate if such interference terms change during transition periods.

2) Since the formula (10) uses a voltage command for calculation of the following capacitor current command term, $$\begin{bmatrix} 0 & -\omega C \\ \omega C & 0 \end{bmatrix} \begin{bmatrix} V\gamma o^* \\ V\delta o^* \end{bmatrix}$$

if the voltage is deviated from the command value due to the influence of disturbance, a capacitor current is no longer controlled accurately, and the charging currents $D\gamma$, $D\delta$ change, resulting in fluctuation of output bus voltage.

In addition to above prior art, U.S. Pat. No. 4823251 applied by the same applicant of the present invention proposes an apparatus which realizes feed forward control by calculating the interference voltage component from current to voltage in a discrete-time system.

SUMMARY OF THE INVENTION

It is therefore an object of the present invention to provide a controller for an AC power converter which suppresses fluctuation of an output bus voltage for eliminating disturbance, particularly for fluctuation of a load current.

In order to attain such object, the controller for an AC power converter of the present invention comprises: a converting means for converting each of the detected signals of output current, output bus voltage and load current into a pair of components along the $\gamma$ axis and $\delta$ axes of a synchronous rotatory coordinate system using a phase signal synchronized with the bus output voltage of the AC power converter; a voltage control means for inputting a deviation between each of output bus voltage commands along the $\gamma$ axis and $\delta$ axis and the respective component of the detected signal of a output bus voltage, and outputting the first signal for correcting such deviation along the $\gamma$ axis and $\delta$ axis respectively; a current command value output means for estimating a current value along each of the $\gamma$ axis and $\delta$ axis to flow into the capacitor of LC filter from the detected signal of output bus voltage, and obtaining a sum of such current value, first signal and detected signal of load current along the $\gamma$ axis and $\delta$ axis respectively as the current command value of AC power converter; a current control means for inputting a deviation between the current command value and detected signal of output current, and outputting a second signal for correcting such deviation along the $\gamma$ axis and $\delta$ axis respectively; and an interference component output means for outputting a third signal, which is the interference component caused by the reactor and capacitor, along the $\gamma$ axis and $\delta$ axis respectively, whereby the current control performance can be improved and distortion of output bus voltage can be suppressed by applying a sum of the second signal and third signal along the $\gamma$ axis and $\delta$ axis of the AC power converter as the voltage command respectively.

DETAILED DESCRIPTION OF THE PREFERRED EMBODIMENTS

The preferred embodiments of the present invention will be now explained in detail with reference to the accompanying drawings.

Figure 1:
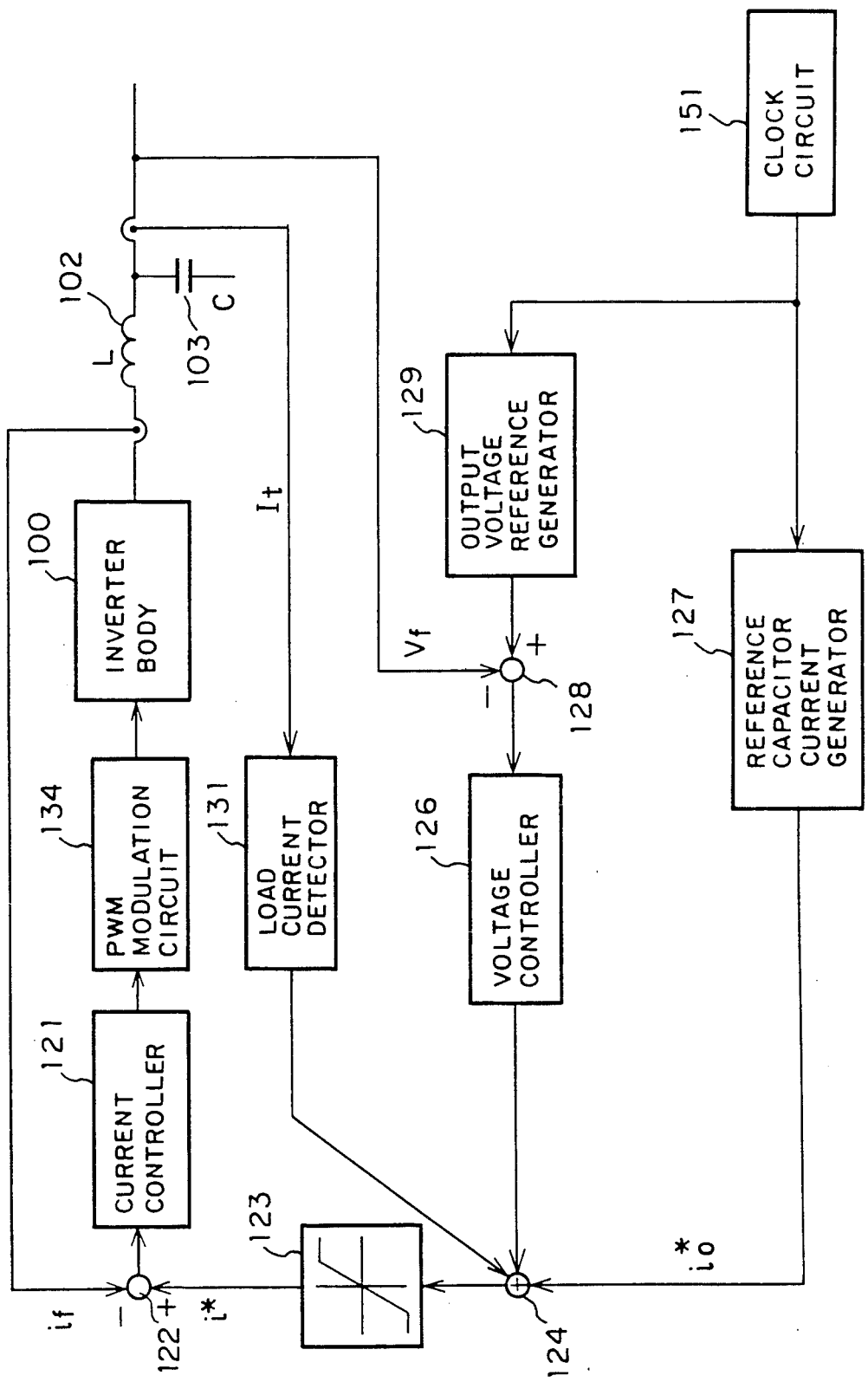
FIG. 1 is a block diagram of a controller for an AC power converter of the prior art.
Figure 2:
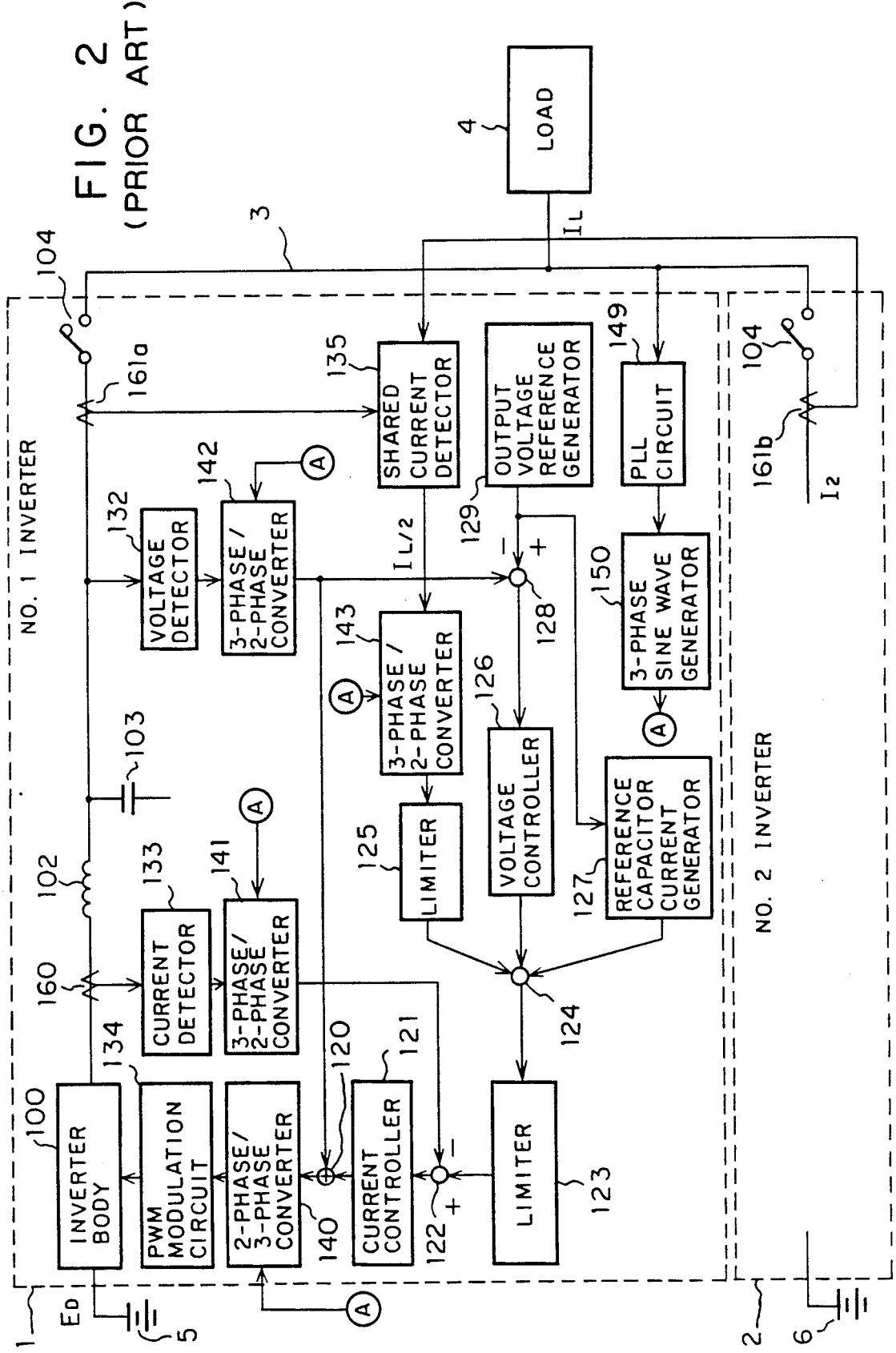
FIG. 2 is a block diagram of another controller for AC power converter of the prior art.
Figure 3:
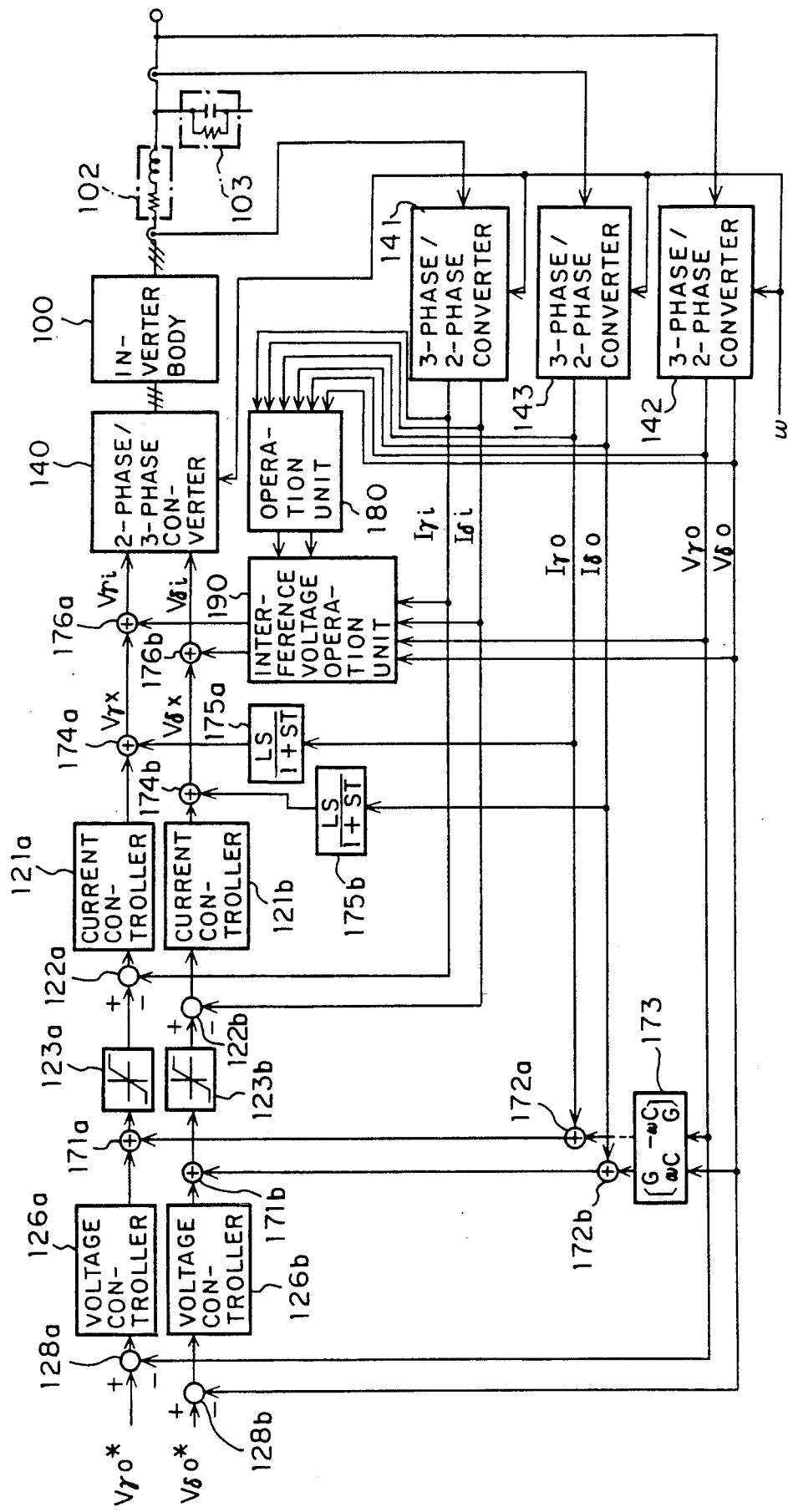
FIG. 3 is a block diagram of a controller for an AC power converter according to one preferred embodiment of the present invention.

In FIG. 3, where the like elements as those in FIG. 1 and FIG. 2 are given like reference numerals, 171, 172 denote adders; 173, an operation unit; 174, an adder; 175, a primary lead filter; 176, an adder; 180, an operation unit; 190, an interference voltage operation units. In FIG. 2, the operation unit for two phases are not separated but are separated in FIG. 3. Therefore, the elements which perform similar functions are given the same reference numbers together with the subscripts a, b for discrimination.

Figure 4:
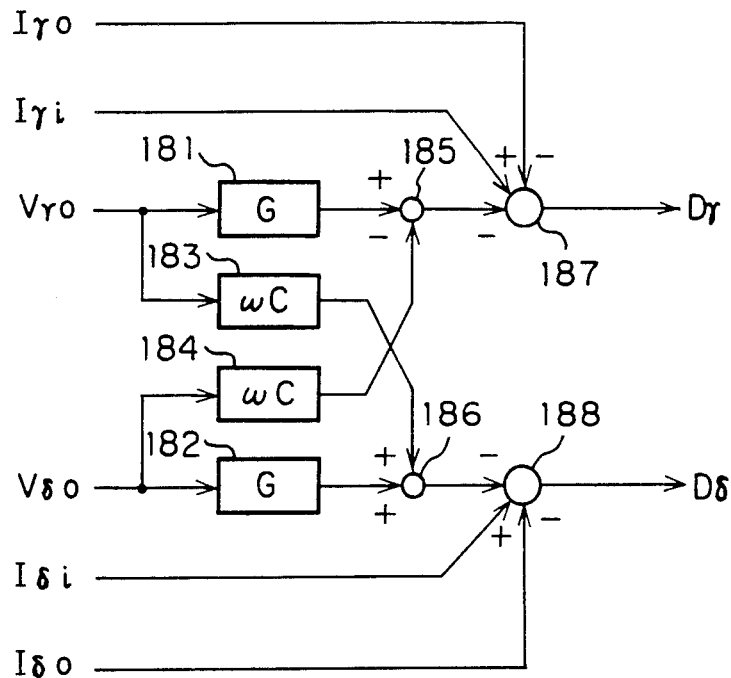
FIG. 4 is a detailed block diagram an unit for calculating current components to change output bus voltage in the embodiment of the present invention.
Figure 5:
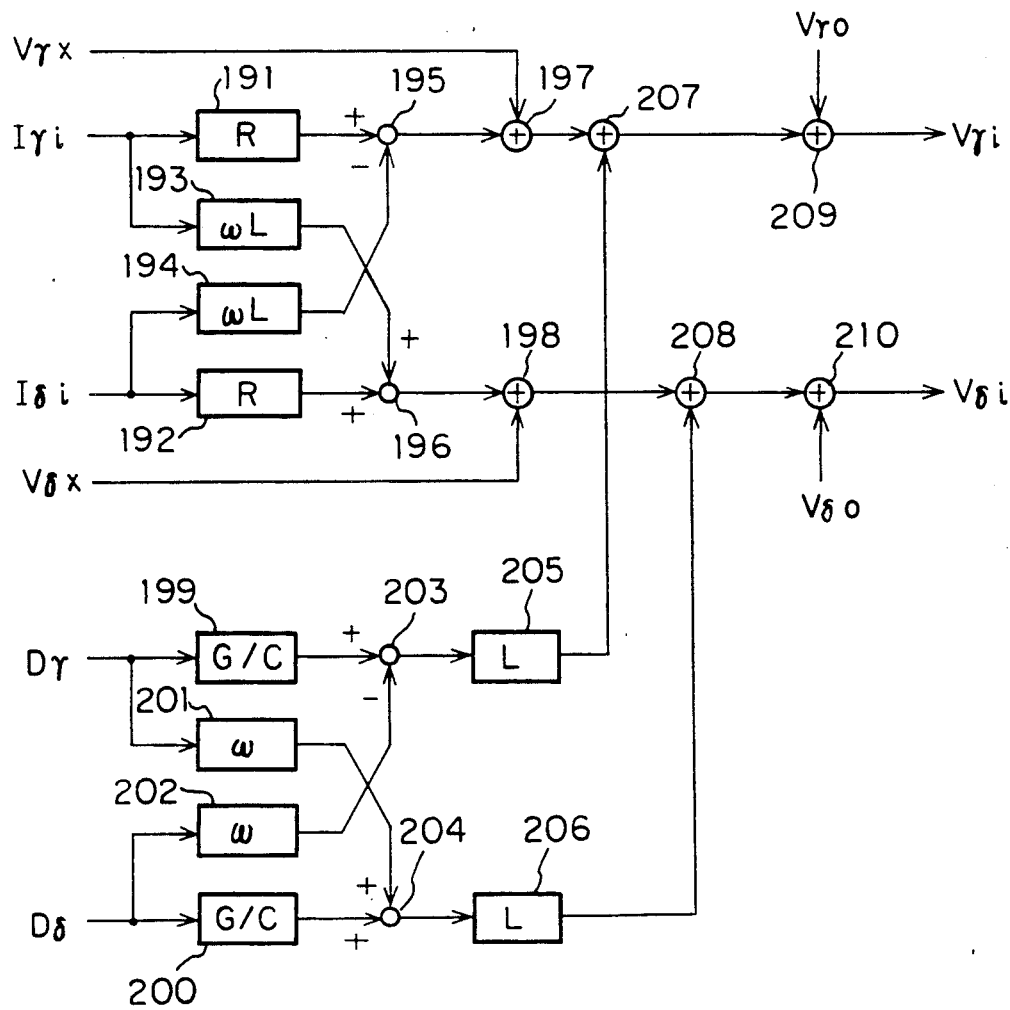
FIG. 5 is a block diagram indicating operations of the interference voltage operation unit 190 of FIG. 3.

In the embodiment of FIG. 3, the operation unit 180 executes calculation of formula (9) to obtain the charging currents $D\gamma$, $D\delta$. The block diagram of operation unit 180 is shown in FIG. 4. The interference voltage operation unit 190 executes the calculation of the following formula (12) from the charging currents $D\gamma$, $D\delta$, output currents $I\gamma i$, $I\delta i$ and output bus voltages $V\gamma o$, $V\delta o$, and outputs the inverter voltage commands $V\gamma i$, $V\delta i$ in addition to the voltage commands $V\gamma x$, $V\delta x$. The block diagram of the interference voltage operation unit 190 is shown in FIG. 5.

$$\begin{bmatrix} V\gamma i \\ V\delta i \end{bmatrix} = \begin{bmatrix} V\gamma o \\ V\delta o \end{bmatrix} + \begin{bmatrix} R & -\omega L \\ \omega L & R \end{bmatrix} \begin{bmatrix} I\gamma i \\ I\delta i \end{bmatrix} + \quad (12)$$

$$L \begin{bmatrix} G/C & -\omega \\ \omega & G/C \end{bmatrix} \begin{bmatrix} D\gamma \\ D\delta \end{bmatrix} + \begin{bmatrix} V\gamma x \\ V\delta x \end{bmatrix}$$

The formula of the system observed from the voltage commands $V\gamma x$, $V\delta x$ is indicated by the formula (13).

$$S \begin{bmatrix} D\gamma \\ D\delta \end{bmatrix} = 1/L \begin{bmatrix} V\gamma x \\ V\delta x \end{bmatrix} - S \begin{bmatrix} V\gamma o \\ V\delta o \end{bmatrix} \quad (13)$$

In the formula (13), the quantity of the $\gamma$ axis and $\delta$ axis components are separated respectively without resulting in interference.

Here, it can be understood from the formula (7) that the charging currents $D\gamma$ and $D\delta$ must be controlled to zero in order to control the output bus voltages $V\gamma o$ and $V\delta o$ to a constant value. In the formula (13), it can also be understood that the charging currents $D\gamma$, $D\delta$ fluctuate according to differentiation of the load currents $I\gamma o$, $I\delta o$. Accordingly, fluctuation of charging currents $D\gamma$, $D\delta$ can be suppressed in case the voltage commands $V\gamma x$, $V\delta x$ take into account the differentiation terms of load currents $I\gamma o$, $I\delta o$ in order to control the charging currents $D\gamma$, $D\delta$. In practice, since the differentiation increases noise, addition is carried out by passing the load current signals through the primary lead filter 175.

The current control is indicated by the formula (14). It can be rewritten as the formula (15).

$$\begin{bmatrix} V\gamma x \\ V\delta x \end{bmatrix} = GI(s) \left( \left\{ \begin{bmatrix} D\gamma^* \\ D\delta^* \end{bmatrix} - \begin{bmatrix} D\gamma \\ D\delta \end{bmatrix} \right\} + \frac{LS}{1+ST} \begin{bmatrix} I\gamma o \\ I\delta o \end{bmatrix} \right) \quad (14)$$

$$\begin{bmatrix} V\gamma x \\ V\delta x \end{bmatrix} = GI(s) \left( \left\{ \begin{bmatrix} D\gamma^* \\ D\delta^* \end{bmatrix} + \begin{bmatrix} G & -\omega C \\ \omega C & G \end{bmatrix} \begin{bmatrix} V\gamma o \\ V\delta o \end{bmatrix} + \begin{bmatrix} I\gamma o \\ I\delta o \end{bmatrix} \right\} - \begin{bmatrix} I\gamma i \\ I\delta i \end{bmatrix} + \frac{LS}{1+ST} \begin{bmatrix} I\gamma o \\ I\delta o \end{bmatrix} \right) \quad (15)$$

The term enclosed in the braces { } in the formula (15) is considered as a command value of the inverter current. The adders 171, 172 and operation unit 173 calculate for these values. The inverter current is limited by the limiter 123 for protecting the elements of inverter 100. Moreover, the subtractor 122 calculates inverter current deviation and the current controller 121 carries out current control.

In addition, the subtractor 128 and voltage controller 126 carry out the constant voltage control by controlling the charging current to correct the voltage deviation from the command value. The voltage control is expressed by the formula (16).

$$\begin{bmatrix} D\gamma^* \\ D\delta^* \end{bmatrix} = Gv(s) \left( \begin{bmatrix} V\gamma o^* \\ V\delta o^* \end{bmatrix} - \begin{bmatrix} V\gamma o \\ V\delta o \end{bmatrix} \right) \quad (16)$$

As explained above, since a current is controlled so that the output bus voltage does not change, fluctuation of output bus voltage can be minimized and output voltage distortion can also be lowered.

In the above embodiment, the control system has been constituted considering the resistance of the reactor and conductance G of the capacitor, but the resistance and conductance may be neglected, without any problem when the resistance R or conductance G is set to zero.

Moreover, the control is carried out in the above embodiment by providing a primary lead filter, but even if it is eliminated, the output voltage distortion performance can be improved more than that in the control system of the prior art.

On the contrary, the output voltage distortion performance can also be improved even further by inserting the primary lead filter and simplifying the voltage command as indicated by the following formula (17).

$$\begin{bmatrix} V\gamma i \\ V\delta i \end{bmatrix} = \begin{bmatrix} V\gamma o \\ V\delta o \end{bmatrix} + \begin{bmatrix} R & -\omega L \\ \omega L & R \end{bmatrix} \begin{bmatrix} I\gamma i \\ I\delta i \end{bmatrix} + \begin{bmatrix} V\gamma x \\ V\delta x \end{bmatrix} \quad (17)$$

The above explanation is based on the condition that the present invention utilizes an inverter, but another power converter can also be used. In addition, the principle of FIG. 3 may also be realized by a discrete circuit utilizing an analog operation amplifier or by a microprocessor and software processing under digital control by the digital signal processor.

As explained heretofore, according to the present invention, a capacitor current command is calculated from a voltage feed back value, the an interference component is applied to a voltage command of AC power converter and a load current component is applied thereto through the primary lead filter, and therefore the control can be made so that the output bus voltage does not fluctuate in the presence of disturbance and particularly in the presence of fluctuation of load current.

What is claimed is:

1. A controller for an AC power converter, comprising:
    detecting means for detecting a converter output current, an output bus voltage and a load current of a load connected to an output bus of said AC power converter through a filter, and outputting detected signals corresponding to each detected current and voltage, respectively;
    converting means for converting each of the detected signals of the converter output current, output bus voltage, and load current into two coordinate axis components of a synchronous rotating coordinate system by using a phase signal synchronized with the phase of said output bus voltage;
    voltage control means responsive to input signals each representing a deviation of an output bus voltage component from a corresponding output bus voltage component command signal, for developing a first deviation correction signal correcting the deviation along each of the respective axes of said coordinate system;
    current command value output means responsive to said output bus voltage components, for estimating a current value along each of said respective axes to be applied to a capacitor of said filter, and adding together said current value, said load current components, and said first deviation correction signal to form a current command signal;
    current control means responsive to input signals each representing a deviation of a converter output current component from said current command signal, for developing a second deviation correction signal correcting the deviation of said converter output current component along each of said respective axes;
    interference component output means for outputting an interference correction signal which represents an interference component caused by said capacitor and a reactor of said filter along each of said respective axes; and
    adder means for adding together said second deviation correction signal and said interference correction signal to form a voltage command signal for controlling the output of said AC power converter.

2. A controller for an AC power converter according to claim 1, wherein said voltage control means comprises:
    a substractor for subtracting said output bus voltage component from said corresponding output bus voltage component command signal; and
    a voltage controller responsive to an output of said subtractor for developing said first deviation correction signal.

3. A controller for an AC power converter according to claim 1, wherein said current command value output means comprises:
   an operation unit for estimating said current value along each of said respective axes to be applied to said capacitor of said filter in response to said output bus voltage components;
   a first adder for adding the estimated current value from said operation unit to said load current components;
   a second adder for adding outputs of said first adder to said first deviation correction signal to form said current command first; and
   a limiter for limiting said current command signal to a predetermined maximum value.

4. A controller for an AC power converter according to claim 1, wherein said current control means comprises:
   a subtractor for subtracting said converter output current components from said current command signal; and
   a current controller responsive to an output of said subtractor for developing said second deviation correction signal.

5. A controller for an AC power converter according to claim 1, wherein said interference component output means comprises:
   an operation unit responsive to said converter output current components, said load current components, and said output bus voltage components, for calculating charging currents along each of said respective axes; and
   an interference voltage operation unit responsive to said charging currents, said converter output current components, and said output bus voltage components, for developing interference voltage components and outputting said interference voltage components as said interference correction signal.

6. A controller for an AC power converter according to claim 1, wherein said adder means comprises:
   a·primary lead filter for filtering said load current components;
   a first adder for adding together outputs of said primary lead filter and said second deviation correction signal; and
   a second adder for adding together outputs of said first adder and said interference correction signal to form said voltage command signal for controlling the output of said AC power converter.

7. A controller for an AC power converter, comprising:
   detecting means for detecting a converter output current, an output bus voltage and a load current of a load connected to an output bus of said AC power converter through a filter, and outputting detected signals corresponding to each detected current and voltage, respectively;
   voltage control means responsive to an input signal representing a deviation of a detected output bus voltage signal from a corresponding output bus voltage command signal, for developing a first deviation correction signal correcting said deviation;
   current command value output means responsive to said detected output bus voltage signal, for estimating a current value to be applied to a capacitor of said filter, and adding together said current value, said detected load current signal, and said first deviation correction signal to form a current command signal;
   current control means responsive to an input signal representing a deviation of a detected converter output current signal from said current command signal, for developing a second deviation correction signal correcting the deviation of said detected converter output current signal;
   interference component output means for outputting an interference correction signal which represents an interference component caused by said capacitor and a reactor of said filter; and
   adder means for adding together said second deviation correction signal and said interference correction signal to form a voltage command signal for controlling the output of said AC power converter.

* * * * *

UNITED STATES PATENT AND TRADEMARK OFFICE
CERTIFICATE OF CORRECTION

PATENT NO. : 5,065,304
DATED : November 12, 1991
INVENTOR(S) : Shinzo Tamai et al.

It is certified that error appears in the above-identified patent and that said Letters Patent is hereby corrected as shown below:

Column 1, line 37, after "current" (first occurrence) insert --command--.

Column 2, line 44, delete "of".

Column 4, line 8, "an" should be --the-- and "the" should be --an--;
        line 15, delete "in";
        line 60, "component" should be --components--.

Column 5, line 40, "a" should be --the-- and "the" should be --a--.

Column 6, line 4, "an" should be --of an operation--;
        same line, after "unit" insert --180 of Fig. 3.-- and delete rest of sentence;
        line 7, after "a" insert --detailed--;
        same line, delete "indicating operations";
        line 20, "unit" should be --units--.

Column 7, line 21, delete "as".

Column 8, line 5, delete "the";
        line 63, "substractor" should be --subtractor--.

UNITED STATES PATENT AND TRADEMARK OFFICE
CERTIFICATE OF CORRECTION

PATENT NO. : 5,065,304

DATED : November 12, 1991

INVENTOR(S) : Shinzo Tamai et al.

It is certified that error appears in the above-identified patent and that said Letters Patent is hereby corrected as shown below:

Column 9, line 13, "first" should be --signal--.

Signed and Sealed this

Fifth Day of October, 1993

*Attest:*

BRUCE LEHMAN

*Attesting Officer*     *Commissioner of Patents and Trademarks*